(12) United States Patent
Dworkin et al.

(10) Patent No.: US 7,142,669 B2
(45) Date of Patent: Nov. 28, 2006

(54) CIRCUIT FOR GENERATING HASH VALUES

(75) Inventors: James D. Dworkin, Chandler, AZ (US); Michael J. Torla, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1286 days.

(21) Appl. No.: 09/725,821

(22) Filed: Nov. 29, 2000

(65) Prior Publication Data

US 2002/0066014 A1    May 30, 2002

(51) Int. Cl.
*H04L 9/28* (2006.01)
*G06F 7/76* (2006.01)
*G06F 17/10* (2006.01)

(52) U.S. Cl. ............... 380/28; 380/37; 380/42; 708/203

(58) Field of Classification Search .......... 380/28, 380/37, 42; 713/189; 708/230, 203
See application file for complete search history.

(56) References Cited

U.S. PATENT DOCUMENTS

| | | | | |
|---|---|---|---|---|
| 4,314,349 A | * | 2/1982 | Batcher | 708/230 |
| 4,399,517 A | * | 8/1983 | Niehaus et al. | 708/210 |
| 4,739,195 A | * | 4/1988 | Masaki | 326/55 |
| 4,896,296 A | * | 1/1990 | Turner et al. | 326/38 |
| 5,623,545 A | * | 4/1997 | Childs et al. | 380/2 |
| 6,708,273 B1 | * | 3/2004 | Ober et al. | 713/189 |

OTHER PUBLICATIONS

Schneier, Bruce, "Applied Cryptography", 1996, John Wiley and Sons, Second Edition, pp. 436-441.*

* cited by examiner

*Primary Examiner*—Ayaz Sheikh
*Assistant Examiner*—Matthew Henning
(74) *Attorney, Agent, or Firm*—James L. Clingan, Jr.

(57) ABSTRACT

A Message Digest Hardware Accelerator (MDHA) 10 for implementing multiple cryptographic hash algorithms such as the Secure Hashing Algorithm 1 (SHA-1), the Message Digest 4 (MD4) algorithm and the Message Digest 5 (MD5) algorithm. A register file (12) is initialized to different data values. A function circuit (22) performs logical operations based on the selected algorithm and provides a data value to a summing circuit (30) that is summed with mode dependent constant values selected from registers (34 and 36), round and step dependent data words generated by a register array block (32) to calculate the hash value for a text message stored in registers (100–115).

13 Claims, 2 Drawing Sheets

CIRCUIT FOR GENERATING HASH VALUES

This invention is related, in general, to the transmission of a signal or data and, more specifically, to the integrity of the received data following the transmission.

When data is sent over a network, issues such as privacy, authenticity and integrity are typically addressed. Privacy is achieved through encryption of the data to ensure that others cannot read the data. Authenticity guarantees that the data received is the same as the data that was sent and that the claimed sender is in fact the actual sender of the original data. Integrity requires that the data received is the data that was sent and has not been altered in transit.

Data integrity ensures that data is transmitted from source to destination without undetected alteration. Integrity is provided using an algorithm that takes any arbitrary or finite length of text and produces a one-way hash of that data as a "fingerprint" or "message digest". Message digests are sometimes referred to as cryptographic checksums. The recipient of the message and the hash re-computes the hash of the message and compares the computed hash to the received hash. If the compared fingerprints do not match, then the data has been altered. On the other hand, if the fingerprints match then it is highly unlikely that anything in the data packet has been changed in transit and the integrity of the files is assured. Since a hash is a many-to-one mapping, absolute integrity can never be detected, however, the hash value is so large (typically 160 bits) that the odds of a collision are infinitesimally small.

The same fingerprints are generated each time the data is hashed and the fingerprints are non-reversible. Cryptographic hash functions are strong one-way functions. In other words, it is computationally infeasible to determine the data or any arbitrary data that hashes to the same fingerprint based solely on the fingerprint. A variety of hash algorithms can be used to provide data integrity of transmitted data. The various algorithms partition the data into different data lengths and use different constants in processing the algorithms. The various algorithms also compute different logic combinations and utilize different numbers of clock cycles to complete the hash process.

A common algorithm that ensures data integrity has not been accepted and prior art has not provided a standardized solution. By now it should be appreciated that a cost-effective integrated hardware solution is needed that selectively processes various algorithms in generating a hash of a variable length message.

BRIEF DESCRIPTION OF THE DRAWINGS

The same reference numbers are used in FIG. 1 and FIG. 2 to denote the same elements.

DETAILED DESCRIPTION OF THE DRAWINGS

Figure 1:
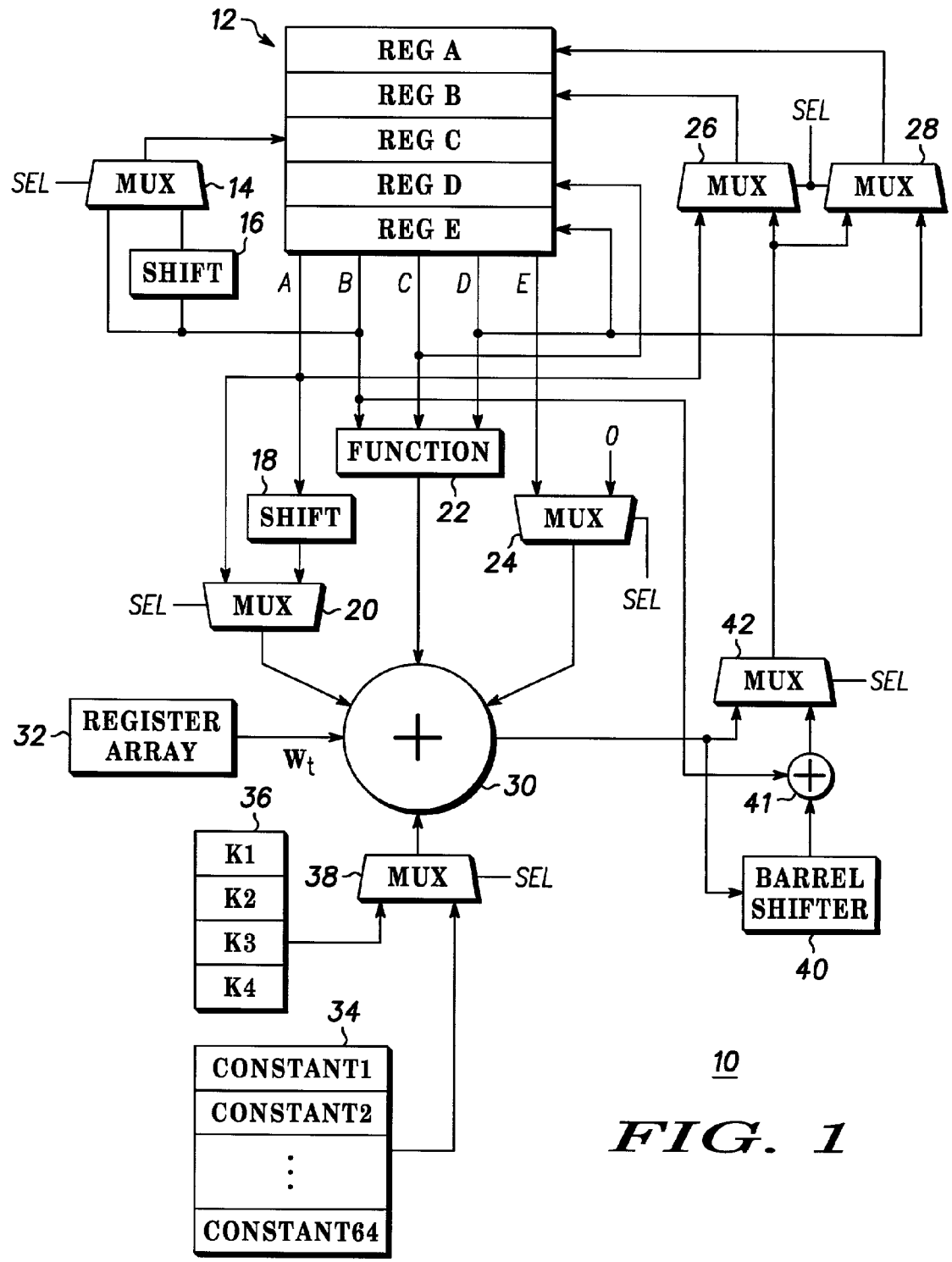
FIG. 1 is a block diagram of a Message Digest Hardware Accelerator (MDHA)

Referring to FIG. 1, a block diagram of a Message Digest Hardware Accelerator (MDHA) 10 is shown. MDHA 10 has the capability for implementing multiple cryptographic hash algorithms, specifically, the Secure Hashing Algorithm 1 (SHA-1), the Message Digest 4 (MD4) algorithm, and the Message Digest 5 (MD5) algorithm. MDHA 10 operates in the SHA-1 mode when performing the SHA-1 algorithm, the MD4 mode when performing the MD4 algorithm, and the MD5 mode when performing the MD5 algorithm.

MDHA 10 receives an input text message of finite or arbitrary length depending on the algorithm and breaks that text message into 512-bit blocks. When operating in the SHA-1 mode, MDHA 10 generates an output as a 160-bit message digest. When operating in the MD5 mode, MDHA 10 generates an output as a 128-bit message digest. When operating in the MD4 mode, MDHA 10 generates an output as a 96-bit message digest. Thus, the SHA-1 mode produces a hash length and chaining variable length of 160 bits, the MD5 mode produces a hash length and chaining variable length of 128 bits, and the MD4 mode produces a hash length and chaining variable length of 96 bits. The computation of a hash value involves many clock cycles, with intermediate results stored as chaining variables.

MDHA 10 includes a register file 12 having registers REG A, REG B, REG C, REG D and REG E that hold intermediate and final results of the hash function. When a new hash value is to be computed, the values stored in these registers are initialized to specific values, and then altered on every clock cycle to contain chaining variables. The 32-bit data word stored in register REG A is labeled A, the data word stored in register REG B is labeled B, the data word stored in register REG C is labeled C, the data word stored in register REG D is labeled D and the data word stored in register REG E is labeled E.

A function circuit 22 receives data words B, C and D and performs logical operations on those data words. The logical data value at the output of function circuit 22 is dependent upon rounds and steps, i.e., clock cycles. For instance, MDHA 10 operating in the SHA-1 mode has four rounds of processing, each round having 20 steps. MDHA 10 operating in the MD5 mode also has four rounds of processing, but each round having 16 steps. MDHA 10 operating in the MD4 mode has three rounds of processing, each round having 16 steps. The output of function circuit 22 is connected to a summing circuit or adder 30.

MDHA 10 further includes a shift circuit 18 and a mux 20, each having an input coupled for receiving the data word A. The other input of mux 20 is connected to the output of shift circuit 18 and receives a 5-bit left rotate value of data word A from shift circuit 18. When the SEL signal controlling mux 20 is set to cause MDHA 10 to operate in the SHA-1 mode, mux 20 transfers the shifted data word A as generated by shift circuit 18 to adder circuit 30. However, when the SEL signal controlling mux 20 is set to cause MDHA 10 to operate in the MD5 mode, mux 20 transfers data word A to adder circuit 30.

MDHA 10 includes register files 34 and 36, each for storing constant values. Although register files 34 and 36 are shown in FIG. 1 as separate storage elements, the constant values could be stored in a single memory device. Register file 34 stores sixty-four data words having a length of 32-bits that are used in computing the SHA-1 algorithm. Specifically, the value CONSTANT1 from register file 34 is supplied through mux 38 to adder 30 in the first round, the value CONSTANT2 is supplied in the second round, . . . , and the value CONSTANT64 is supplied in the sixty-fourth round. Register file 36 stores four data words having a length of 32-bits that are used is to process the MD5 algorithm. The value K1 from register file 36 is supplied through mux 38 to adder 30 in the first round, the value K2 is supplied in the second round, the value K3 is supplied in the third round and the value K4 in the fourth round. A mux 38 is controlled by a SEL signal that receives a data constant stored in register file 34 for transfer to adder 30 when MDHA 10 operates in the SHA-1 mode and receives a data constant stored in register file 36 for transfer to adder 30 when MDHA 10 operates in the MD5 mode. It should be noted that individual values stored in register files 34 and 36 are selected by tri-state buffers or multiplexers (not shown) and transferred to mux 38. It should be pointed out that for ease of description and clarity, the MDHA 10 architecture illustrated in FIGS. 1 and 2 does not explicitly show the control lines necessary for computing the MD4 and RIPE-MD algorithms. One skilled in the art would understand the additional control lines for selecting these algorithms and the changes implied in function circuit 22 and adder 30, and the selection of the appropriately stored constant values.

As previously mentioned, adder 30 receives constant values from register files 34 and 36, the data word A stored in register file 12 or a shifted version of that data word A through mux 20, and also a primitive logic function generated by function circuit 22. Adder 30 further receives through a mux 24 the data word E stored in REG E of register file 12 when MDHA 10 operates in the SHA-1 mode or a zero value when MDHA 10 operates in the MD5 mode. Adder 30 also receives a 32-bit value $W_t$ from a register array block 32.

The 32-bit output of adder 30 is connected to an input of a mux 42 and an input of a barrel shifter 40. The output of barrel shifter 40 is connected to an input of an adder 41. The other input of adder 41 receives the data word B stored in REG B. The output of adder 41 is connected to the other input of mux 42. The output of mux 42 is commonly connected to an input of mux 26 and mux 28. The other input of mux 26 receives the data word A stored in REG A and the other input of mux 28 receives the data word D stored in REG D. The output of mux 26 is connected to the input of REG B and the output of mux 28 is connected to the input of REG A. In the SHA-1 mode, the 32-bits of data from adder 30 are transferred through mux 42 and mux 28 to REG A. Also in the SHA-1 mode, the data word A is transferred through mux 26 to REG B. In the MD5 mode, the 32-bits of data from adder 30 are passed through barrel shifter 40 and mux 42 and stored in REG B. Also in the MD5 mode, data word D is transferred through mux 28 to REG A.

MDHA 10 includes a shift circuit 16 and a mux 14, each having an input coupled for receiving data word B. The output of shift circuit 16 is connected to the other input of mux 14. Shift circuit 16 provides a 30-bit circular left shift of data word B. The output of mux 14 is connected to REG C. As shown in FIG. 1, connections are provided for transferring data word C to REG D and data word D to REG E.

Figure 2:
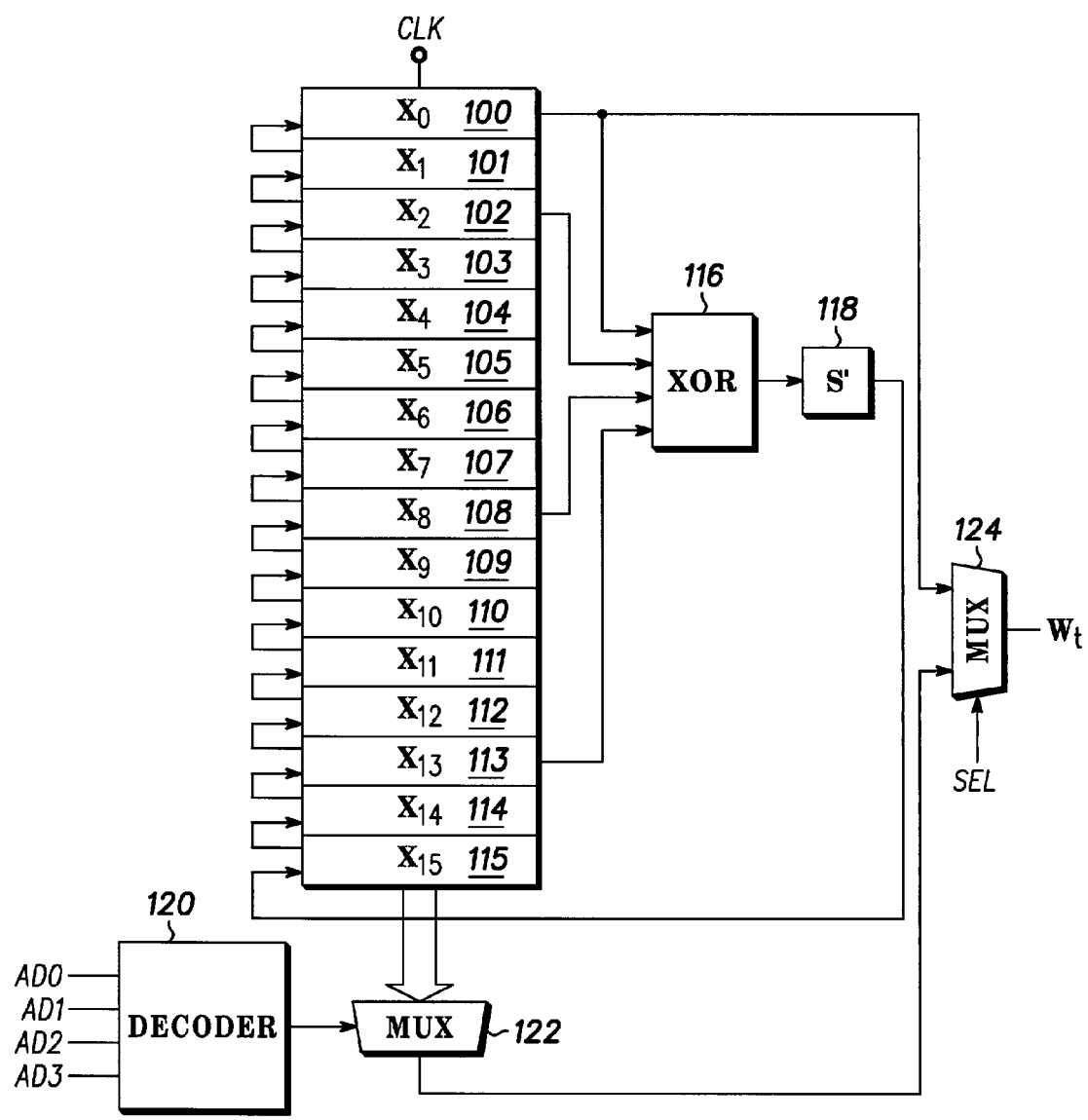
FIG. 2 is a block diagram of a register array as shown in FIG. 1.

FIG. 2 is a block diagram of a register array 32 for storing a 512-bit text message and providing a 32-bit output signal $W_t$ that is a linear combination of the data stored in the register array. MDHA 10 utilizes shared hardware for computing the signal $W_t$ used in the SHA-1, MD4, and MD5 algorithms. Register array 32 includes registers 100–115, with each register storing 32-bits of the text message. Register 100 stores the first 32-bits of the 512-bit text message as data word $X_0$, register 101 stores the second 32-bits as data word $X_1$, . . . , and register 115 stores the sixteenth 32-bits as data word $X_{15}$.

In the SHA-1 mode, the register array 32 forms a word wise circular queue where the contents of each register can be loaded into its adjacent register. On each clock cycle during operation, word $X_{15}$ in register 115 is loaded into register 114, word $X_{14}$ in register 114 is loaded into register 113, . . . , and word $X_1$ in register 101 is loaded into register 100. Further, XOR block 116 receives the data words $X_0$, $X_2$, $X_8$ and $X_{13}$ and provides an exclusive-OR (XOR) function of that data according to the function $X_0 \oplus X_2 \oplus X_8 \oplus X_{13}$, where the symbol $\oplus$ is the XOR function. A rotate block 118 performs a one bit left circular shift or rotate of the data generated by XOR block 116 prior to storing the data in register 115. In the SHA-1 mode a signal SEL causes the data word that is stored in register 100 to transfer through a multiplexer (mux) 124 as the 32-bit word $W_t$.

In the MD4 or MD5 mode, address inputs AD0, AD1, AD2 and AD3 are decoded by a decoder circuit 120 to SEL one of the data words $X_0$–$X_{15}$ stored in respective registers 100–115. The 32-bit data word selected through mux 122 is further transferred through mux 124 as the value of $W_t$. Decoder circuit 120 selects the appropriate data word stored in register array block 32 for transfer to $W_t$ as required by the algorithm. The signals received at address inputs AD0, AD1, AD2 and AD3 are computed in the control unit (not shown) according to an equation specified by the algorithm.

In operation, the MDHA 10 architecture provides a combination of storage registers, a logic unit, a modulo adder, and other circuitry, to create a one-way hash of a text message on input data streams of variable size. A digital fingerprint of short and long input messages is computed using either the SHA-1, MD4 or MD5 algorithm. The input text message is segmented as a sequence of N fixed-length blocks, where N is equal to 512-bits. Padding and length bits are appended to ensure that the total length of the message is an integer number of blocks. The message is padded by appending one data bit having a logic one value followed by an appropriate number of data bits having a logic zero value. Prior to appending the padding bits in the last block, 64-bits of data are inserted that specify the message length modulo $2^{64}$. The insertion of the message length reduces the chances that two messages of different lengths will have the same hash value.

The data words A, B, C, D and E stored in register file 12 are preset to specific values in accordance with the selected algorithm. The preset value or initial seed value is used along with the text message data stored in registers 100–115, i.e., the block data, to compute the hash value of the first block. Next, the hash value of the first block is used as the seed for the second block. The process proceeds to compute the hash value of the second block based on the stored data in the second block and the hash value of the first block. Thus, the hash value for each block is related to the stored data in that block and the hash value computed for the previous block. The hash value of the entire input stream is the hash value of the last block.

In particular, when the MD5 algorithm is selected, MDHA 10 operates on 512 bit blocks utilizing four chaining variables contained in REG A, REG B, REG C and REG D. It should be noted that in the MD5 mode REG E is not used and adder 30 receives logic zero values from mux 24. Before processing any blocks the chaining variables stored in register file 12 are initialized, for example, to a preset hexadecimal value for REG A of 01234567, the value 89ABCDEF for REG B, the value FEDCBA98 for REG C, and the value 76543210 for REG D. Then, for each of the 512 bit blocks, four rounds of operations are performed, with each round consisting of sixteen steps. Each of the sixteen steps per round requires one clock cycle. Thus, register file 12 has four registers preset to a first group of values for the MD5 algorithm and five registers preset to a second group of values for the SHA-1 algorithm.

Each step involves computing a logic value in function circuit 22 using three of the chaining variables, i.e., data words B, C and D, as operands. Function circuit 22 generates a 32-bit output data word in the first round according to the logical function of (B^ C) V (NOT B^ D), where the symbol^ is the AND logical operator and the symbol V is the OR logical operator. However, in the second round, function circuit 22 provides an output data word according to the logical function (B^ D) V (C^ A NOT D), where the symbol ⊕ is the exclusive-OR (XOR) function. In the third round the output data word has a value according to the logical function of (B⊕C⊕D). In the fourth round the output data word has a value according to the logical function (C⊕(B V NOT D). Recall that there are sixteen steps per round, so each logical function is used for sixteen clock cycles before changing.

The logic value from function circuit 22 is summed in adder 30 with the value of the chaining variable in data word A, a subrange of bits in the current block from register 32, and a constant supplied from register file 36 through mux 38. The addition is modulo $2^{32}$ with no carry out provided from adder 30. The value of the constant from register file 36 is round dependent. The summed value supplied from adder 30 is circularly left shifted or rotated by s bits, where s is round and step dependent, and the output of barrel shifter 40 is stored into REG B and used in the next step. Simultaneously, REG A is loaded with the original value stored in REG D, REG C is loaded with the original value stored in REG B and REG D is loaded with the original value stored in REG C. The process repeats sixteen times for each of the four rounds, with the MD5 process taking sixty-four total steps to calculate the hash value for the first block. After all of the steps have been completed, the new chaining variables are the values for the data words A, B, C and D when added to the old values for data words A, B, C and D. Note that the adder and registers for holding the temporary values for the data words A, B, C and D are not shown in the figures.

On the other hand, when the SHA-1 algorithm is selected, MDHA 10 operates on 512 bit blocks utilizing five chaining variables contained in REG A, REG B, REG C, REG D and REG E. The text message is again segmented as a sequence of N fixed-length blocks, where N is equal to 512-bits, with padding and length bits appended to ensure that the total length of the message is an integer number of blocks. The data words A, B, C, D and E are initialized for the first data block. Before processing any blocks the chaining variables stored in register file 12 are initialized, for example, to a preset hexadecimal value for REG A of 67452301, the value EFCDAB89 for REG B, the value 98BADCFE for REG C, the value 10325476 for REG D and the value C3D2E1 F0 for REG E. Then, for each of the 512 bit blocks, four rounds of steps are performed, with each round consisting of twenty steps.

A sequence of logical values used in the SHA-1 mode is supplied from function circuit 22. Function circuit 22 receives the three 32-bit data words B, C and D and produces a 32-bit data word as output, supplied to adder 30. The 32-bits of output data from function circuit 22 are generated in the first round according to the logical function of (B^ C) V (NOT B^ C), where the symbol A is the AND logical operator and the symbol V is the OR logical operator. In the second round function circuit 22 provides output data according to the logical function (B⊕C⊕D), where the symbol ⊕ is the exclusive-OR (XOR) function. In the third round data is output according to the logical function (B^ C) V (B^ D) V (C^ D) and in the fourth round data is output according to the logical function (B⊕C⊕D).

The logic value from function circuit 22 is summed in adder 30 with the value of the chaining variable in data word E, and then to a five bit left rotated value on the data word A supplied by shift circuit 18. The addition is modulo $2^{32}$ with no carry out provided from adder 30. A constant value supplied from register file 34 and a value supplied from register array block 32 that are round and step dependent are summed with the previous result and the output of adder 30 stored in REG A. Simultaneously, REG B is loaded with the original value stored in REG A, REG C is loaded with a shifted value of the original value stored in REG B, REG D is loaded with the original value stored in REG C, and REG E is loaded with the original value stored in REG D.

By now it should be appreciated that a cost-effective integrated hardware solution has been shown that selectively processes various algorithms in generating a hash value of a variable length text message. MDHA 10 processes the text message using the SHA-1 algorithm, the MD4 algorithm or the MD5 algorithm. Depending of the selected mode, MDHA 10 processes one of the selected algorithms using registers that initialize to different data values, uses different logical functions to generate a logic data value, provides mode dependent constant values and round and step dependent data words to an adder circuit that calculates the hash value for the text message. Thus, MDHA 10 provides electrical conduction paths, storage registers, data shifters and selectable data values to a summing circuit to properly calculate a hash value according to the SHA-1, MD4 and MD5 algorithms.

The invention claimed is:

1. An apparatus for selectively processing first and second cryptographic hash algorithms, comprising:
   a register file (12) having at least five registers for storing chaining variables;
   a function circuit (22) receiving first (B), second (C) and third (D) chaining variables and an output that provides a logical data value;
   a first multiplexer (24) having an input coupled to the register file for receiving a fourth (E) chaining variable and an output that provides the fourth chaining variable when the first cryptographic hash algorithm is being processed by the apparatus and a zero value when the second cryptographic hash algorithm is being processed by the apparatus; and
   a summing circuit (30) having a first input coupled to the output of the function circuit for receiving the logical data value, a second input coupled to the output of the first multiplexer, and an output coupled to the register file.

2. The apparatus of claim 1, further comprising:
   a barrel shifter (40) having an input coupled to the output of the summing circuit;
   an adder (41) having an input coupled to an output of the barrel shifter; and
   a second multiplexer (42) having a first input coupled to the output of the summing circuit and a second input coupled to an output of the adder.

3. The apparatus of claim 2, further comprising:
   a third multiplexer (26) having a first input coupled to the output of the second multiplexer (42) and a second input coupled to the register file (12) for receiving a fifth (A) chaining variable; and
   a fourth multiplexer (28) having a first input coupled to the output of the second multiplexer and a second input coupled to the register file (12) for receiving the third (D) chaining variable.

4. The apparatus of claim 3, wherein the second multiplexer and the fourth multiplexer receive a signal that transfers a summed value from the output of the summing circuit to the register file when the message digest hardware accelerator is processing an SHA-1 hash algorithm.

5. The apparatus of claim 3, wherein the second multiplexer and the third multiplexer receive a signal that transfers a summed value from the output of the barrel shifter to the register file when the message digest hardware accelerator is processing an MD5 hash algorithm.

6. The apparatus of claim 3, further comprising:
a first shift circuit (16) having an input coupled to the register file for receiving the first (B) chaining variable; and
a fifth multiplexer (14) having a first input coupled to an output of the first shift circuit, a second input coupled to the input of the first shift circuit and an output coupled to the register file for providing the second chaining variable.

7. The apparatus of claim 6, further comprising:
a second shift circuit (18) having an input coupled to the register file for receiving the fifth (A) chaining variable; and
a sixth multiplexer (20) having a first input coupled to an output of the second shift circuit, a second input coupled to the input of the second shift circuit and an output coupled to another input of the sunning circuit.

8. A circuit for generating hash values in a first hash mode and a second hash mode, comprising:
a storage circuit (34, 36);
a register array (32) having registers for storing a message and an output for providing a round dependent data value (Wt);
a register file (12) for storing first (B), second (C), third (D), fourth (B) and fifth (A) chaining variables; and
an adder (30) having a first input coupled for receiving a first set of constant values stored in the storage circuit for the first hash mode and a second set of constant values for the second hash mode, a second input coupled to the output of the register array, a (hiM input coupled for receiving the fifth (A) chaining variable in the second hash mode and a shifted fifth chaining variable in the first hash mode, a fourth input coupled for receiving a logical function in accordance with the first, second and third chaining variables, and a fifth input coupled for receiving the fourth chaining variable in the second hash mode and a zero value in the first hash mode.

9. An apparatus integrated to provide a hash value of a variable length message in accordance with a first algorithm and a second algorithm, comprising:
a register file (12) having five registers preset to a first group of values for the first algorithm and to a second group of values for the second algorithm, the register file storing first (B), second (C), third (D), fourth (B) and fifth (A) chaining variables;
a function circuit (22) receiving first, second and third chaining variables and generating, as an output of the function circuit, a first logical data value for the first algorithm and a second logical data value for the second algorithm;
a storage element (34, 36) for supplying a first set of constant values for the first algorithm and a second set of constant values for the second algorithm; and
a summing circuit (30) having a first input coupled to the output of the function circuit (22) and a second input coupled to the storage element for receiving one of the first and second sets of constant values.

10. The apparatus of claim 9, further including a register ray (32) having a decoder circuit (120) and a plurality of registers for selecting a data word stored in one of the plurality of registers and supplying the data word to an output of the register array when computing the first algorithm.

11. The apparatus of claim 10, wherein the register array further includes:
an exclusive-OR (116) coupled for simultaneously receiving first, second, third and fourth data words stored in the plurality of registers and for generating data; and
a rotate block (118) having an input coupled to an output of the exclusive-OR and supplying a one bit left circular shift of the data generated by the exclusive-OR to one of the registers in the plurality of registers.

12. The apparatus of claim 10, wherein an output of the register array is supplied from a word wise circular queue when computing the second algorithm.

13. The apparatus of claim 9, wherein the first algorithm is an MD5 algorithm and the second algorithm is an SHA-1 algorithm.

* * * * *